United States Patent
Hall et al.

(10) Patent No.: US 10,953,511 B2
(45) Date of Patent: Mar. 23, 2021

(54) SYSTEM AND METHOD FOR DETECTING POSITION LOSS IN AN OBJECT UNDER A MECHANICAL INFLUENCE

(71) Applicant: Woolf Aircraft Products, Inc., Romulus, MI (US)

(72) Inventors: Donald Hall, Ypsilanti, MI (US); Evan Basnaw, Belleville, MI (US)

(73) Assignee: Woolf Aircraft Products, Inc., Romulus, MI (US)

( * ) Notice: Subject to any disclaimer, the term of this patent is extended or adjusted under 35 U.S.C. 154(b) by 0 days.

(21) Appl. No.: 16/507,356

(22) Filed: Jul. 10, 2019

(65) Prior Publication Data

US 2020/0016714 A1 Jan. 16, 2020

Related U.S. Application Data

(60) Provisional application No. 62/697,188, filed on Jul. 12, 2018.

(51) Int. Cl.
*B23Q 17/22* (2006.01)
*G01D 5/39* (2006.01)
*B24B 49/12* (2006.01)

(52) U.S. Cl.
CPC ............ *B23Q 17/22* (2013.01); *G01D 5/39* (2013.01); *B24B 49/12* (2013.01)

(58) Field of Classification Search
CPC .................................................. B23Q 17/22
See application file for complete search history.

(56) References Cited

U.S. PATENT DOCUMENTS

| 4,926,723 A * | 5/1990 | Lothammer | ............. B23Q 3/16 82/118 |
|---|---|---|---|
| 2010/0063617 A1 | 3/2010 | Mori et al. | |
| 2018/0147684 A1 | 5/2018 | Ekback et al. | |

OTHER PUBLICATIONS

UK Combined Search and Examination Report dated Jan. 14, 2020 for counterpart GB Application GB 1 909 967.7.

* cited by examiner

*Primary Examiner* — Nabil H Syed
*Assistant Examiner* — Cal J Eustaquio
(74) *Attorney, Agent, or Firm* — Dykema Gossett PLLC

(57) ABSTRACT

A system is placed upon a target object and a machining tool. The system comprises a variety of sensors to detect adverse relative movement and position loss of the target object as it is affected by the machining tool. The system further comprises portable sensors in communication with a printed control board, configured to communicate position data to a remote computing device. The remote computing device may receive the position data, process it, and present output to a display. The system may detect position, kinematic, and mechanical issues present during the machining process by comparing the position data to thresholds, including position loss, and automatically adjust the operation of the machining tool in response.

20 Claims, 15 Drawing Sheets

SYSTEM AND METHOD FOR DETECTING POSITION LOSS IN AN OBJECT UNDER A MECHANICAL INFLUENCE

CROSS-REFERENCE TO RELATED APPLICATIONS

This application claims the benefit of U.S. provisional application No. 62/697,188, filed Jul. 12, 2018 (the '188 application). The '188 application is hereby incorporated by reference as though fully set forth herein.

BACKGROUND a. Technical Field

This disclosure relates generally to a system and method for detecting position loss in an object being affected by a machining tool or other external force.

b. Background Art

This background description is set forth below for the purpose of providing context only. Therefore, any aspects of this background description, to the extent that it does not otherwise qualify as prior art, is neither expressly nor impliedly admitted as prior art against the instant disclosure.

In the art, the term machining is generally applied to a variety of applications in the broad world of manufacturing, such as turning, milling, drilling, planning, bending, sawing and grinding. In the art, it is desirous to maintain the relative position between the machining tool and the target object (i.e., performing operations relative to machine zero and target object zero). However, machining applications carry significant unintentional and unpredictable kinematic and mechanical issues that may negatively impact the machining process and influence the resultant product.

Position Loss.

One exemplary kinematic issue in the art is adverse relative movement between the machining tool and the target object. Adverse relative movement may also be referred to as position loss. As known in the art, position loss can be caused by the target object slipping due to inadequate clamping, movement of the affecting member of the machining tool, or slippage, mis-calibration, or inconsistent homing within the machining tool itself. These errors often appear at random and are nearly impossible to predict, often failing to manifest in test runs with the machining tool.

Accompanying the rise of automated machining tools is the proliferation of computer numerical control ("CNC"), whereby the automated machining tool affects a target object according to preprogrammed instructions to meet precise specifications. Automated machining tools and CNC rely upon fixed starting and continuing positions of the target object being affected in order to produce a desired result. Since position loss and residual stresses are unpredictable, CNCs relying upon pre-programmed instructions will be unable to account for movement of the target object. That is to say, there can arise a situation where there is a difference between the commanded position calculated by the CNC and the actual position of the target object.

In one example, position loss may occur during the bending of a section of a target body. The applied force from the bending process can exceed the force used to clamp the target body in place, resulting in unintended movement of the target body during the bending process. This movement can cause significant variation in the parts being produced, leading to increased setup time, out-of-specification parts, and significant scrap and material loss.

Prior Art Methodologies for Detecting Position Loss.

In the art, there have been attempts to detect and control position loss. Position loss can be felt through physical contact by an operator while the target body is in the mount. The operator may use a series of test marks in order to determine if position loss has occurred. Further, the operator may observe the finished product for slip marks. Methods such as photogrammetry or use of coordinate-measuring machines (CCMs) can be used to detect slip or position loss after the machining process.

The Marking Method.

In one prior art method, the operator would use a scribe tool or writing implement to create a witness line on the target object where the tooling and the object meet after a successful lockup. During the machining process the operator will observe the line to watch for movement. If the line (or part of the line) moves into the tooling and disappears, the operator will know that position loss has occurred.

The marking method presents a number of difficulties and problems when observing position loss. Using this method, the distance of the adverse movement is estimated by the operator, and therefore the accuracy of this method is subjective. In order to detect position loss, the operator must constantly observe and identify slip before the lockup condition is reset. This prior art method also requires the operator to be close enough to the machining tool to see the witness line, which presents practical and safety issues. For example, if the machine is a CNC bender, the operator is not able to get close enough to the target object in order to observe the witness line due to a light screen protecting the operator from the bend arm. Further, the CNC bender may also perform multiple locking and bending cycles without pausing or stopping to allow the operator to observe position loss and make corrections. Further, the witness line cannot be reapplied between machining cycles.

The Feel Method.

In another prior art method, the operator would first clamp up on the target object into the machining tool and then places his/her fingers at the joint between the machining tool and the target object. As the machine cycles, the operator would feel the presence of slip and where it begins in the cycle.

The feel method presents a number of difficulties and problems when observing position loss. The operator must be present at all times during the cycle and must be in close contact with the machine. When position loss does occur, the amount of loss detected is subjective upon the operator. This method also puts the operator's digits at the point of machine contact, creating a strong safety concern. Further, many CNC machines prevent the operator from being close enough to employ the feel method, such as machines with guards specifically designed to prevent operator digits from contact with the machining-part interface during a machine cycle.

The Slip Mark Method.

In another prior art method, the operator inspects the target object after machining to look for striations on the object surface. The slip marks may be measured with a set of calipers.

The slip mark method presents a number of difficulties and problems when observing position loss. The observation takes place after the machining process is complete, so it does not provide real-time data on position loss. Not every instance or type of position loss result in slip marks because they are only present when a rough tooling surface produces microscratches in a softer object material. On an object with an already rough surface finish, the slip marks may not be visible. Further, on harder materials, the marks may not occur. Additionally, while observing slip marks may be informative on future machining processes, the affected object bearing the slip marks may still have to be discarded, resulting in material and time loss.

Photogrammetry.

Using photogrammetry or coordinate-measuring machines (CCMs) to analyze finished produces can be used to detect slip or position loss after the machining process. However, this method does not provide real-time position loss data, and is only informative on future machining processes while still resulting in material and time loss for discarded objects.

Therefore, it is desirous to develop a system and method that can detect adverse relative movement and position loss in a manner that is quick, accurate and safe for the operator. It is further desirous to detect position loss as it happens in real-time during the machining process. It is further desirous to develop a monitoring system that is portable, can be adapted to a variety of machining tools and target objects, and may be utilized to monitor position loss from a distance. It is further desirous to develop a portable and adaptable system and method that may perform automatic stop actions or automatic readjustments upon detecting position loss of the target object.

The foregoing discussion is intended only to illustrate the present field and should not be taken as a disavowal of claim scope.

SUMMARY OF THE INVENTION

In one embodiment, detecting position loss is accomplished through the use of remote sensors that are configured to detect the movement of a target object, the operation of a machining tool, and measure any position loss during the machining process. The data is then processed by a computing device and graphically reported to an operator through a display.

In an embodiment, the system comprises an optical motion sensor, a computing device including a memory, having a program code stored therein and a processor in communication with the memory for carrying out instructions in accordance with the stored program code, and an attached output display. The optical motion sensor may be repackaged to significantly reduce its physical size and to provide protection against environmental hazards. The tracking sensor of the optical motion sensor may be repositioned to allow for placement near the body being measured. The embodiment may also contain external pressure sensor(s), such as a limit switch, that detects the opening or closing of the mount and can generate signals relative to the lockup state of the machining tool.

The computing device records any input from the optical motion sensor and external pressure sensors and calculates position loss or any other movement. The display output displays the input, measurements, or results of the calculations of the computing device. Additionally, in an embodiment, the system may detect a lockup of the machining tool and may automatically reset the position calculation for each new step in the machining or for each new target object using data received from the sensor(s). Additionally, in an embodiment, the system may detect position loss and generate a STOP signal to the machining tool. The computing device, the inputs, and the output display may communicate or exchange information wirelessly or through wired means.

In embodiments, the display may also comprise a user-interface configured to receive user input.

In another embodiment, the system may be calibrated to display measurements and calculations in either imperial or metric units. In a further embodiment, the system is compatible with a variety of stationary and mobile devices utilizing a variety of operating systems, such as Windows, Android, macOS, iOS, or Linux. In a further embodiment, the system can integrate directly with software that controls the machining tool and the same may automatically adjust in response to the input from the optical motion sensor or pressure sensors. In another embodiment, the system has a portable power source.

The foregoing and other aspects, features, details, utilities, and advantages of the present disclosure will be apparent from reading the following description and claims, and from reviewing the accompanying drawings.

DETAILED DESCRIPTION

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

An overview of a position loss detection system for monitoring the movement of a target object being acted on by a machining tool will be described in connection with FIG. 1, while a more functional depiction and description will be set forth in connection with FIGS. 2-8.

Figure 1:
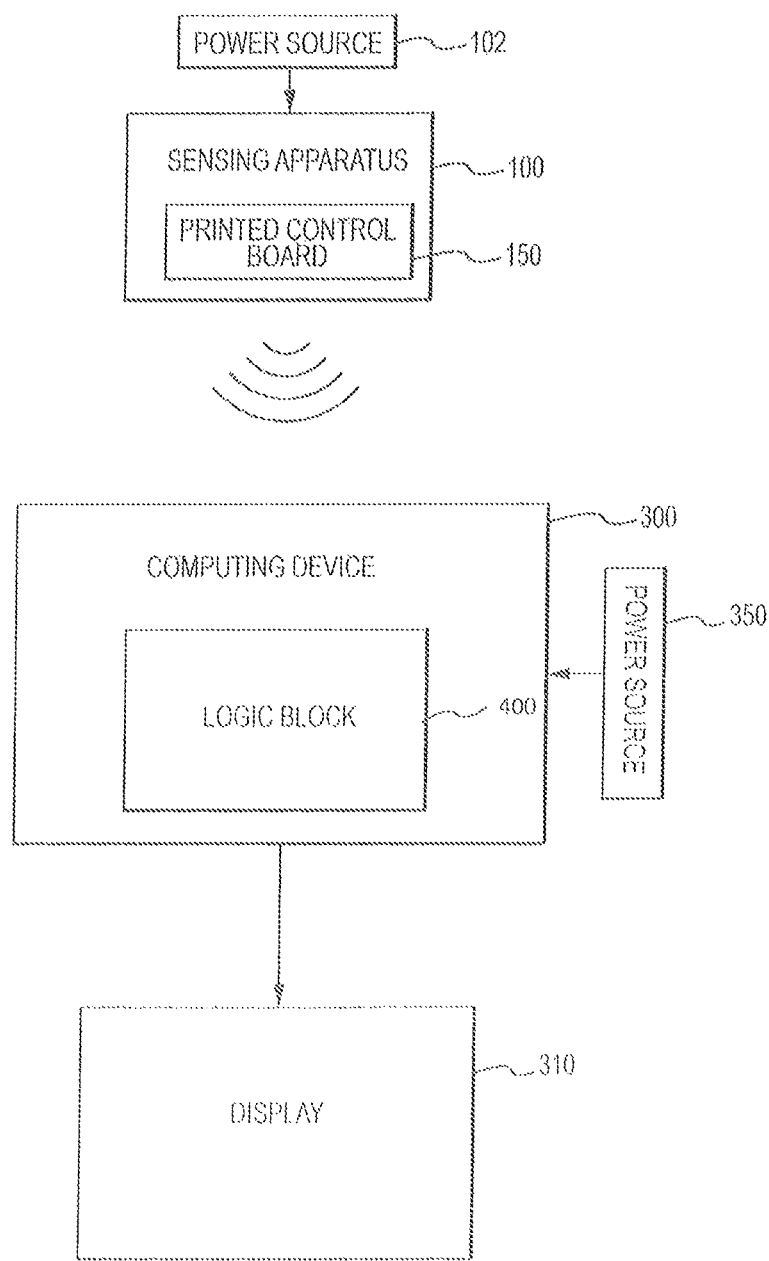
FIG. 1 is a simplified block diagram of the position loss detection system, in an embodiment.

Referring now to the drawings wherein like reference numerals are used to identify identical or similar components in the various views, FIG. 1 is a simplified block diagrammatic view of a position loss detection system in an exemplary environment. In an exemplary environment, the system comprises of a sensing apparatus 100 with a first power source 102, a computing device 300 containing a logic block 400, the computing device 300 operatively connected to a display 310 and receiving power via a second power source 350.

In a manner to be explained in more detail in the forthcoming paragraphs, the sensing apparatus 100 is attached to a target object, a machining tool, or both (neither shown in FIG. 1), wherein the machining tool is affecting the target object. The sensing apparatus 100 detects relative movement between the target object and the machining tool or movement of the target object in isolation and, through wired or wireless means, communicates positional and movement data as positional output to the computing device 300 with the logic block 400. The computing device 300 receives the positional signal and other signals as an input and processes the same via the logic block 400 to generate an output as processed position data. The resulting output is communicated through wired or wireless means to a display 310 for viewing by an operator.

In another embodiment, the positional output is a STOP command that may be communicated via wired or wireless means to the machining tool, such as a CNC machine. In further embodiments, the positional output may be any number of machining commands as known in the art, and may be communicated in any form interpretable by a CNC machine, such as G-code, binary or plain-text.

Figure 2A:
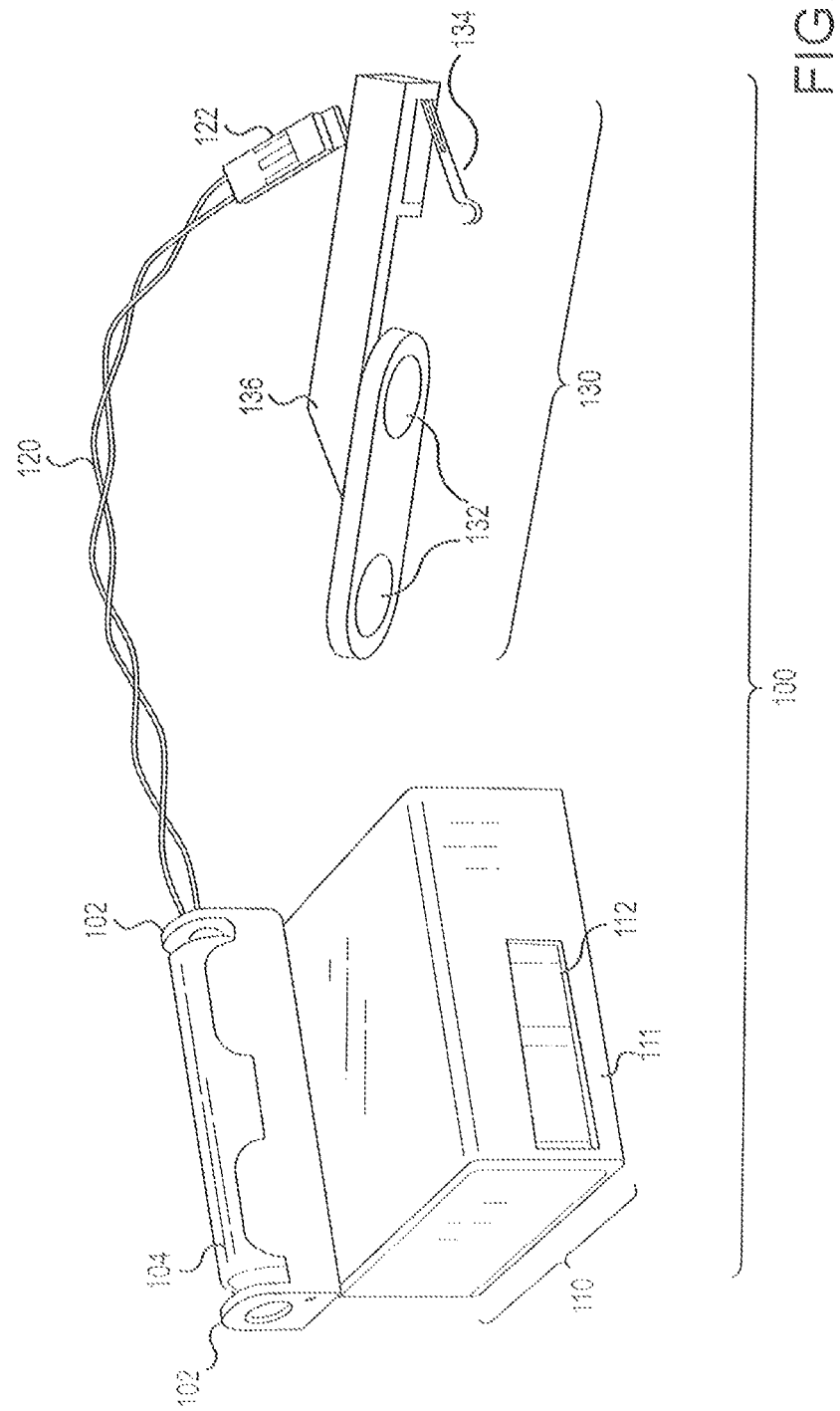
FIG. 2A is a structural representation of a sensing apparatus of the position loss detection system, in an embodiment.

A more detailed description of the sensing apparatus 100 will now be set forth as shown in FIG. 2A. In an embodiment, the sensing apparatus 100 comprises one or more sensors that may be placed on a target object. As shown in FIG. 2A, an optical sensor 112 is mounted within case 110. The case 110 contains an aperture 111 that allows the contained optical sensor 112 to receive sensor input from outside the case 110. The aperture 111 may be located on a side adjacent to a mounting surface 118 (shown in FIG. 2B) of the case 110, wherein the mounting surface 118 may comprise one or more case magnets 116 arranged to mount the case 110 through magnetic means onto a machining tool or other structure. However, a person of ordinary skill in the art would realize that the location of aperture 111, the optical sensor 112, and the case magnets 116 could be adapted to the type of machining tool or application as required. Further, the case 110 may comprise more than one optical sensor input, additional sensory inputs and respective apertures located at various locations of the case 110. In other embodiments, the case 110 may also contain additional types of sensors, such as an rotary encoder that may utilized with machines that rotate the tooling. In this embodiment, the rotary encoder may determine the point of rotation in the machine that tooling slip first occurred.

The sensing apparatus 100, in an embodiment, is powered by portable power source 104 mounted in a power source mount 102. As known in the art, the power source 104 may be any device capable of supplying electric power, such as through one or more electrochemical cells, internal combustion, or magnetic means. Further, the power source 104 may be a power converter, configured to convert electric current from another source to the correct voltage, current, and frequency to power the sensing apparatus 100. In this embodiment, the power source mount 102 may be replaced by an electrical connection port.

As demonstrated in FIG. 2A, the power source 104 is mounted on the case 110 on a side opposite to the case magnets 116. However, depending on the application, the power source 104 may be located on a side adjacent to the magnets or at any other location on the case 110 as the application requires. Further, the power source 104 may be physically apart from the case 110 and may transmit power to the apparatus via a power cord or power adapter.

Figure 2B:
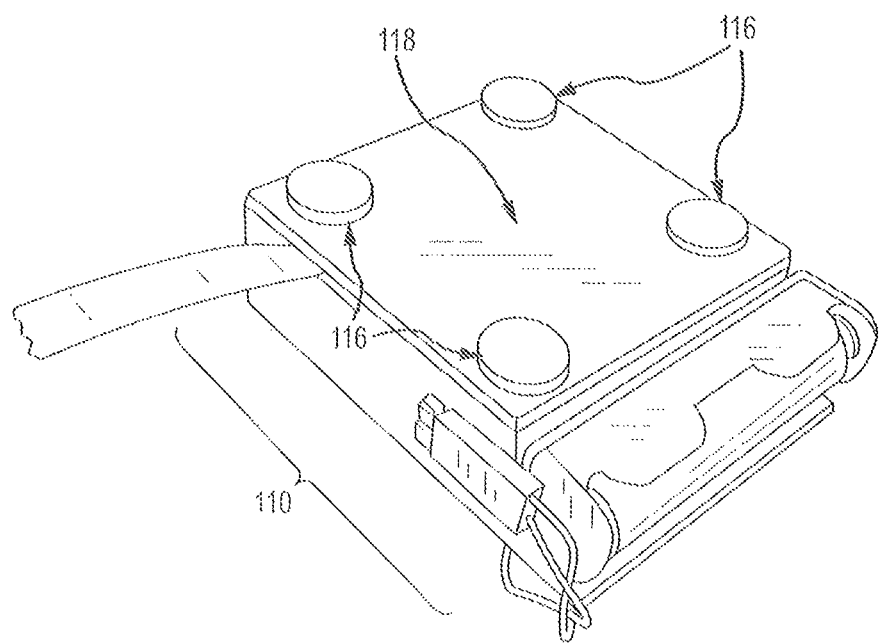
FIG. 2B is a structural representation of the opposite side of the sensing apparatus of the position loss detection system, in an embodiment.

Referring now to FIG. 2B, the mounting surface 118 of the case 110 is shown comprising case magnets 116. The case magnets 116 may be utilized for mounting on an machining tool (not shown), especially if the machine is made of steel or other magnetic metal. However, the mounting surface 118 may utilize any number of fixing method that would allow the case 110 to be mounted as the application requires, such as adhesives or mechanical clamping.

Figure 2C:
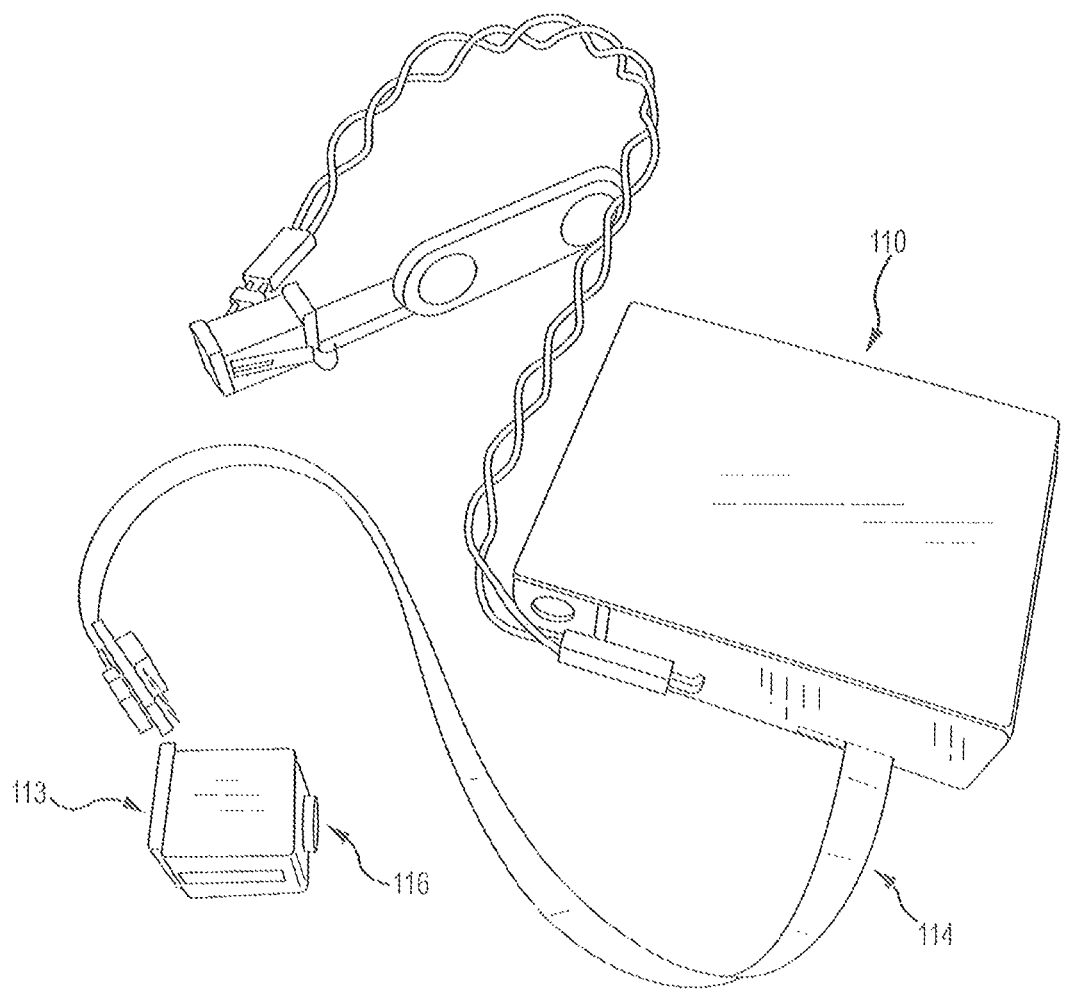
FIG. 2C is a structural representation of the sensing apparatus of the position loss detection system, in an embodiment.

Referring now to FIG. 2C, an alternative embodiment of the optical sensor is shown. In this embodiment, the remote optical sensor 113 is a remote sensor and external to the case 110, and is operatively connected via a data cable 114. The optical sensor 113 may also be coupled with an optical sensor magnet 116, allowing the sensor to be mounted to a steel machining tool. However, in other embodiments, the remote optical sensor 113 may also be coupled with any number of adhesives or mechanical clamping structures to allow mounting on a variety of tools.

The remote optical sensor 113 and the optical sensor 112 may monitor the movement of the target object utilizing a light source, which may include a vertical-cavity surface-emitting laser diode or light-emitting diode. The optical sensors 112 and 113 may emit a laser light at an angle and capture its reflection from the surface of the body via a sensor. The optical sensors 112 and 113 may also emit the laser light in the infrared spectrum. In embodiments, the optical sensors 112 and 113 may be 1000 dpi optical sensor, but any optical non-contact or contact sensors capable of receiving real-time position date may be utilized with higher or lower sensitives as the application requires. The case 110 also contains a printed circuit board 150 ("PCB") (shown in FIG. 2D) configured to process the input received by the optical sensors 112 and 113 and other sensors to be identified in the subsequent paragraphs.

As further demonstrated by FIG. 2A, in an exemplary embodiment, a sensing arm 130, separate and apart from the case 110, is shown. The sensing arm 130 comprises a limit switch 134, wherein the limit switch 134 is configured to sense the motion of one or more machining tool parts. The limit switch 134 may be an electromechanical device comprising an actuator mechanically linked to a set of contacts. When an object moves into contact with the actuator, the plunger of the limit switch 134 operates the contacts to complete an electrical connection. While in the embodiment demonstrated in FIG. 2A the sensing arm 130 is apart from the case, in other embodiments, the sensing arm may be fixed to the case 110 or other portion of the apparatus and system.

In an embodiment, when mounted on the machining tool, the limit switch 134 is in mechanical communication with the machining tool. In operation, the limit switch 134 detects when the machining tool is in a lockup-state, i.e., when one or more parts of the machining tool come together to clamp the target object and the target object can no longer move. In an embodiment, upon detection of a lockup event, the limit switch 134 will output a lockup signal to the PCB 150 (shown in FIG. 2D) through the wired means 120, which is then communicated to computing device 300. In other embodiments, additional types of sensors, such as proximity sensors or pressure switches could be utilized in place of a mechanical limit switch on the sensing arm 130.

Additionally, distal to the limit switch 134, the sensing arm 130 may comprise a mounting member 136 further comprising one or more sensing arm magnets 132. The sensing arm magnets 132 may be used to mount the sensing arm 130 on the target object or machining tool. However, as known to a person of ordinary skill in the art, the sensing arm magnets 132 and the limit switch 134 of the sensing arm 130 may be located at various locations about the sensing arm 130 or case 110 in order to fit the application as required. Additionally, the sensing arm 130 may comprise any number of further sensors as required for the application.

Figure 2D:
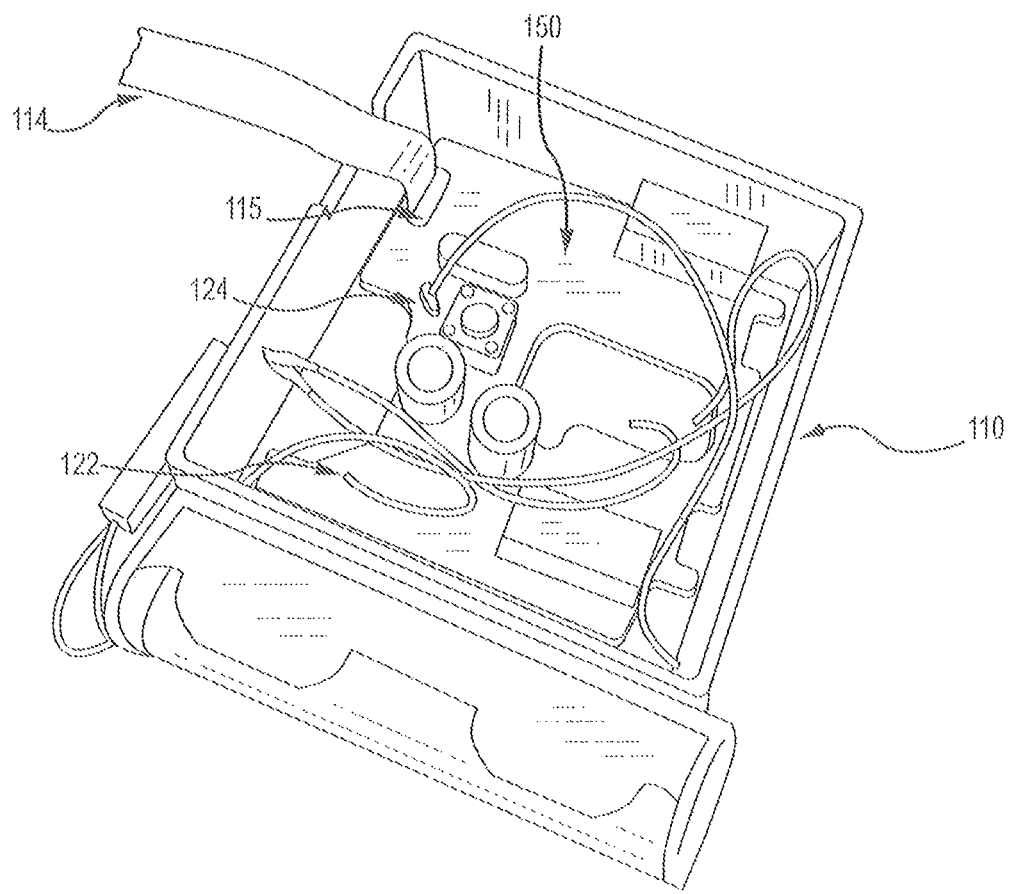
FIG. 2D is a structural representation of the interior of the sensing apparatus of the position loss detection system, in an embodiment.

Referring now to FIG. 2D, an embodiment of the PCB 150 inside case 110 is shown. The PCB 150 may be any type of printed control board commonly known in the art effective for the application, such as receiving inputs from the sensors of the sensing apparatus 100 and transmitting the same to an external computer. As further shown in FIG. 2D, the data cable 114 transmits signals from remote optical sensor 113 to the optical sensor input 115 on the PCB 150. Additionally, the wire means 120 transmits signals from the sensing arm 130 to sensing arm inputs 122 and 124 on the PCB 150.

The sensing arm 130 is operatively and electrically connected to the PCB 150 within case 110 through wired means 120. The wired means 120 transmits sensor data, such as a lockup signal, from the limit switch 134 (or any other sensor) to the PCB 150. The PCB 150 is configured to receive the sensor data as input and convey the input as a position signal or lockup signal through wireless means (e.g., wireless USB) to the computing device 300. As explained more fully herein, the computing device 300 may receive the position signal as two-dimensional coordinates (e.g., x & y coordinates). In an embodiment, the computing device 300 interprets these signals, then calculates an absolute position value for output as a processed position output.

Figure 3:
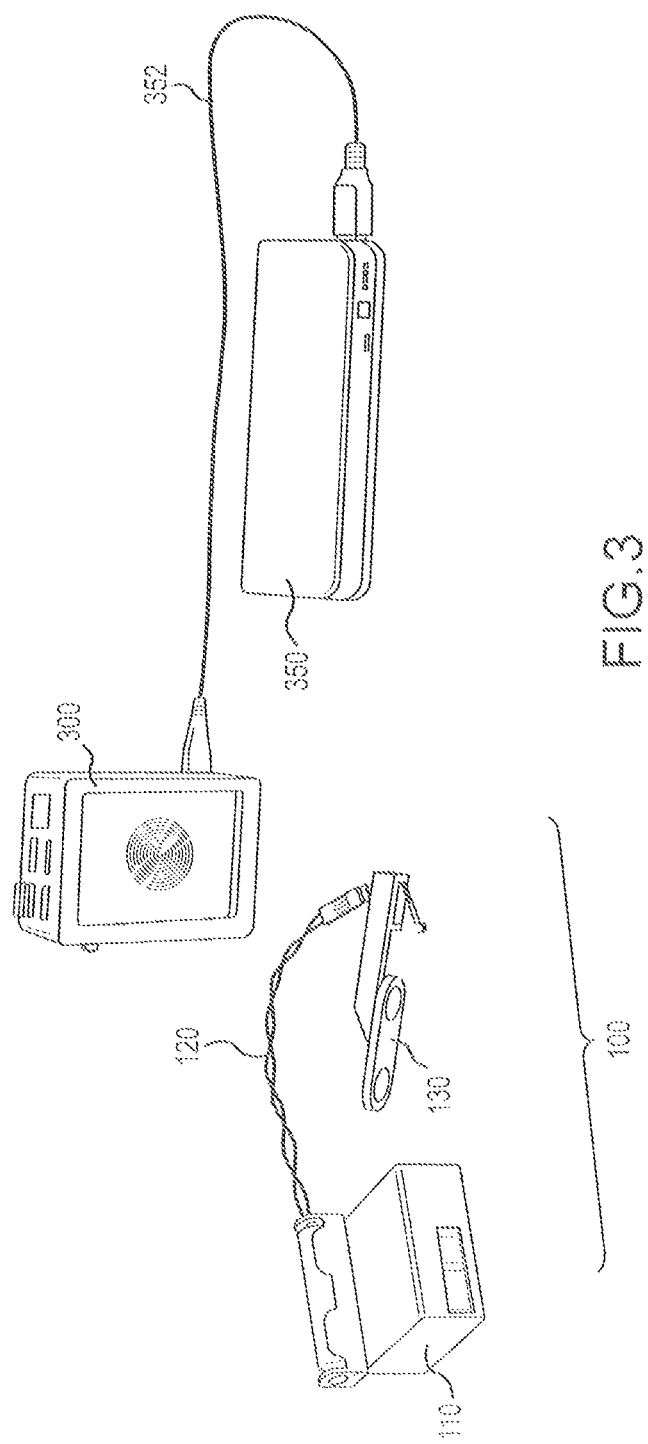
FIG. 3 is a structural representation of a sensing apparatus of the position loss detection system in wireless communication with a computing device, in an embodiment.
Figure 4A:
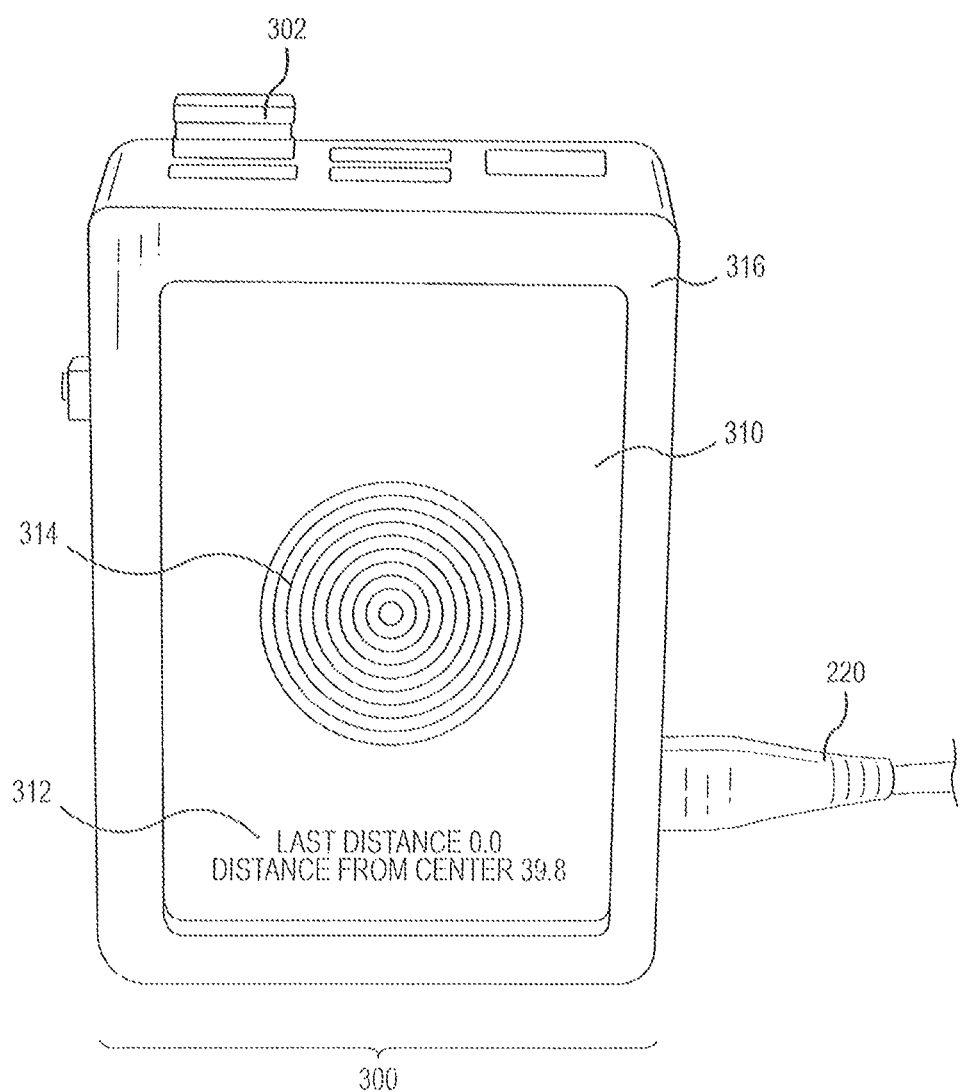
FIG. 4A is a structural representation of a computer device of the position loss detection system operatively connected to a display showing positional data, in an embodiment.
Figure 4B:
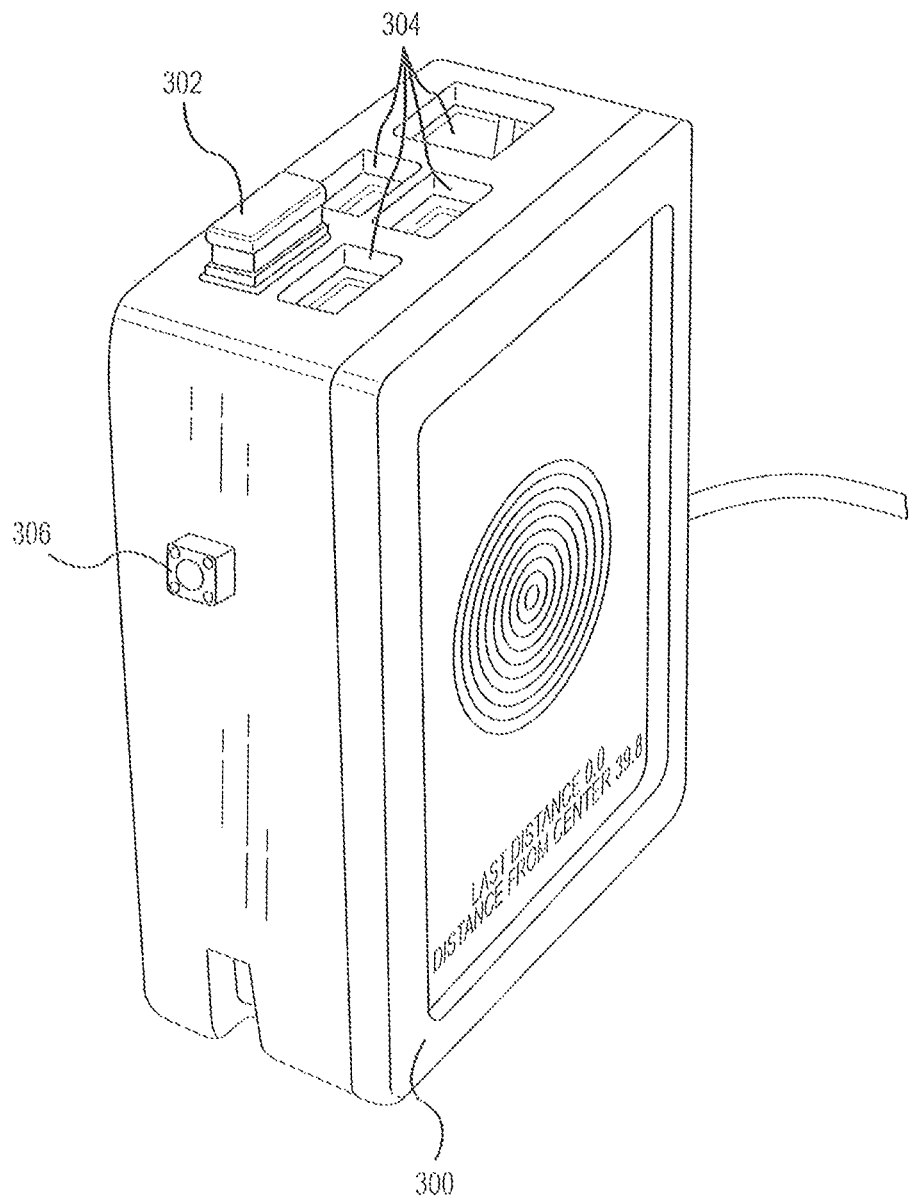
FIG. 4B is an another structural representation of a computer device of the position loss detection system operatively connected to a display showing positional data, in an embodiment.

A detailed description of the structure of the computing device 300 will now be set forth as shown in FIGS. 3, 4A and 4B. As demonstrated by FIG. 3, the computing device 300, in an embodiment, is powered via a portable power source 350 that is operatively connected to the computing device 300 via the power cord 352. As known in the art, the power source 350 may be any device capable of supplying electric power, such as through one or more electrochemical cells, internal combustion, or magnetic means. Further, the power source 350 may be a power converter, configured to convert electric current from another source to the correct voltage, current, and frequency to power the computing device 300.

As demonstrated by FIG. 4A, the computing device 300 may be encased in a portable and durable shell 316 of suitable material and be in operative communication with a display 310 that is configured to visualize the processed position output of the computing device 300. In an embodiment, the display 310 may be configured to display the processed position output of the computing device 300, such as a graphical representation 314 of position loss or distance measured, or text-based output 312.

In various embodiments, the processed position output that is displayed on the display 310 may take many forms or metrics, depending on the application and what is informative to the operator of the machining tool. The display 310 may show the lockup state of the machining tool, a delay period, the last distance measured, the current distance in numerical form, the current distance in a graphical form (e.g., a bar graph), or calibration scale.

In an embodiment, the lockup state shows the current position of the machining tool.

In an embodiment, the delay period is the measurement of time after the lockup state is triggered to the time that the position variable of the target object is reset. This allows for a final shift in position of the target object after the limit switch 134 has been triggered. The delay period may be pre-determined through a default setting or may be set by the operator of the machining tool through a user-interface display 310 (as shown in FIGS. 8A-E).

In an embodiment, the last distance measured is the distance indicated by the optical sensors 112 and 113 for absolute movement of the target object at the time the lockup variable changed. This metric helps the operator identify the positional movement even after the affecting tool has been removed from a lockup state. This metric may be displayed both numerically or in a graphical format (e.g., bar graph). This metric not only allows for easy identification of position loss (i.e., with the bar graph), but also a repeatable number to reference for estimated distance of movement (i.e., with the numerical display).

In an embodiment, the calibration variable is a multiplier for the sensor data input. This allows for different sensors (with different DPI ratings) and different materials to be measured accurately.

An embodiment of the computing device 300 is further demonstrated in FIG. 4B. The shell 316 comprises a variety of apertures 304, positioned to allow external connections to operatively connect and communicate (e.g., provide input and receive output) with the computing device 300 contained therein. As detailed in subsequent paragraphs, the physical components of the input/output block (312 of FIG. 5) of the computing device 300 substantially aligns with the apertures of the shell 316. The input/output block of the computing device 300 may be any number of connections commonly known in the art capable of exchanging information, such as Universal Serial Bus (USB), Video Graphics Array (VGA), Digital Visual Interface (DVI), High-Definition Multimedia Interface (HDMI), and DisplayPort (DP). These recitations are intended to be exemplary only and are not limiting, and a person of ordinary skill in the art would recognized any number of data connections presently available or not yet available that may be utilized to exchange data with the computing device 300. The button at 306 may be a configured to turn off the computing device 300.

Figure 5:
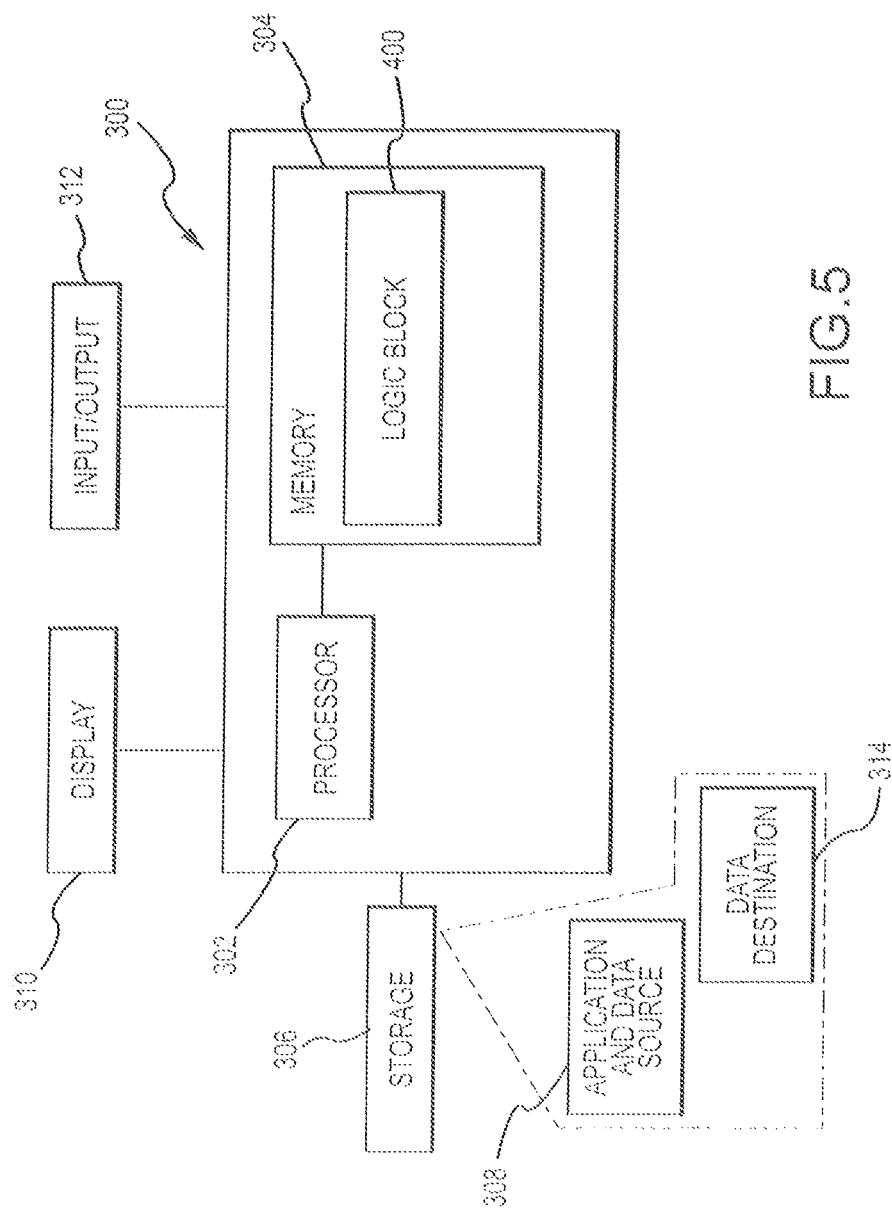
FIG. 5 is a simplified schematic and block diagram of a computing device of the position loss detection system of the position loss detection system containing a logic block, in an embodiment.

A more detailed description of the computing device 300 comprising the logic block 400 will now be set forth as shown in FIG. 5. The computing device 300 includes an electronic processor 302 and a memory 304, a variety of input/output devices generally represented by input/output block 312 (as explained above) and is operatively connected to a display 310. The computing device 300 may further include or be configured to communicate with non-transitory memory, shown as a storage block 306, which may include a local disk drive but may include a data source 308 (including a data source and/or an application source code) as well as a data destination 314.

Processor 302 may comprise a central processing unit (CPU) of conventional construction and may comprise one or plural processors acting in concert. Processor 302 generally may include processing capabilities as well as an input/output (I/O) interface through which processor 302 may receive a plurality of input and generate a plurality of outputs. Memory 304 is provided for storage of data and instructions or code (i.e., software) for processor 302. Memory 304 may include various forms of non-volatile (i.e., non-transitory) memory including flash memory or read only memory (ROM) including various forms of programmable read only memory (e.g., PROM, EPROM, EEPROM) and/or volatile memory including random access memory (RAM) including static random access memory (SRAM), dynamic random access memory (DRAM) and synchronous dynamic random access memory (SDRAM).

The computing device 300 is further configured by way of a logic block 400, which, as implemented in an embodiment, may include code or instructions, which when executed by processor 302, is configured to perform a variety of functions described herein.

It should be understood that for the purposes of this specification, the term "block" includes an identifiable portion of computer code, computational or executable instructions, data, or computational object to achieve a particular function, operation, processing, or procedure. A block may be implemented in software, hardware/circuitry, or a combination of software and hardware. An identified block of executable code, for example, may comprise one or more physical or logical blocks of computer instructions that may, for instance, be organized as an object, procedure, or function. Nevertheless, the executables of an identified block need not be physically located together, but may comprise disparate instructions stored in different locations which, when joined logically together, comprise the block and achieve the stated purpose for the block. A block of executable code could be a single instruction, or many instructions, and may even be distributed over several different code segments, among different programs, and across several memory devices. Similarly, blocks representing data may be embodied in any suitable form and organized within any suitable type of data structure. The data may be collected as a single data set, or may be distributed over different locations including over different storage devices.

The computing device 300 may operate according to a supporting operating system, for example only, Microsoft Windows (e.g., 32-bit and/or 64-bit versions), variants of Linux, Apple Mac OS X, and the like. Further, in an exemplary embodiment, the computing device 300 may be a small, portable, single-board computer, such as the RASPBERRY PI® developed and distributed by the Raspberry Pi Foundation, headquartered in Cambridge, United Kingdom.

Figure 7A:
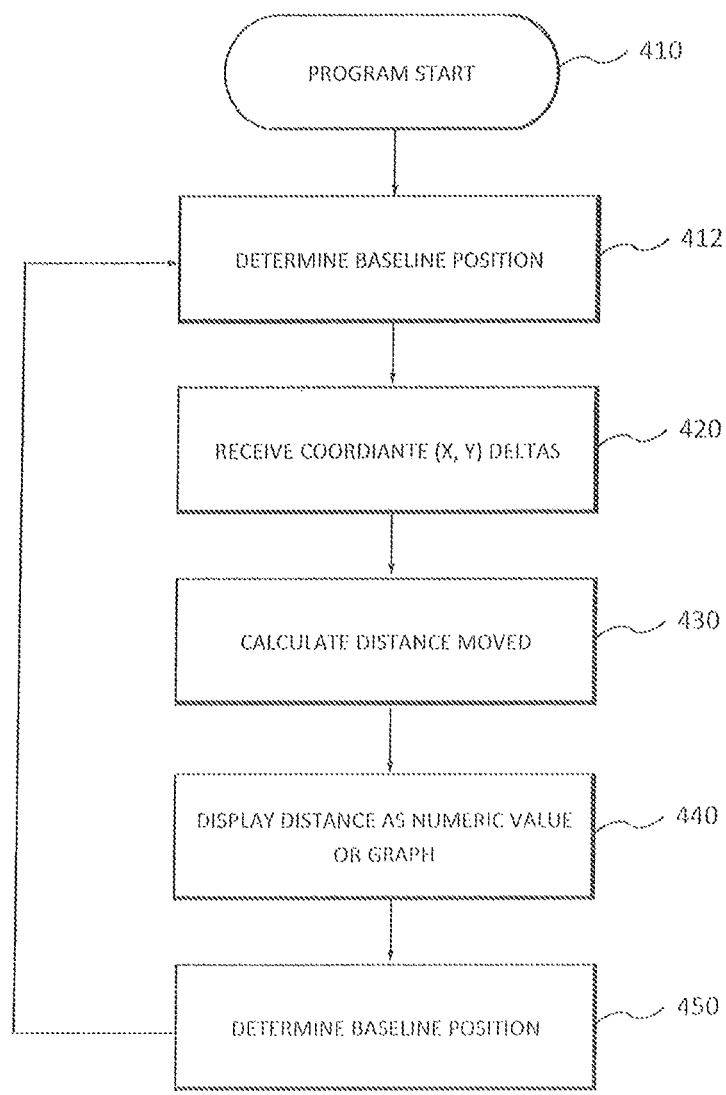
FIG. 7A is a block diagram of the operation of the logic block, in an embodiment.

FIG. 7A is a flow diagram of an embodiment of the computing device 300 of the instant disclosure, showing the operation of the executable code of the logic block 400 in greater detail. At 410, the operation of the logic block begins. At 412, the logic block receives the lockup signal and determines the baseline position of the target object. At 420, the logic block receives the position signal, in one embodiment, as (x, y) coordinates, and at 430 calculates the distance moved by the object. At 430, in an embodiment, the executable code of the logic block 400 calculates the distance moved by the object by comparing the received coordinates against the baseline position.

Continuing to 440, the logical block 400 displays the position data, including the calculated distanced moved, on the display 310. At 450, the logic block 400 monitors the lockup state of the machining tool (in one embodiment, through monitoring for received lockup signals from the limit switch 134), and, upon change in the lockup state of the machining tool, reset the baseline position to the current position of the object (see 412). At this point, the logic block 400 may then continuously receive position data to monitor for position loss against the baseline position by repeating the above-mentioned procedure.

Figure 7B:
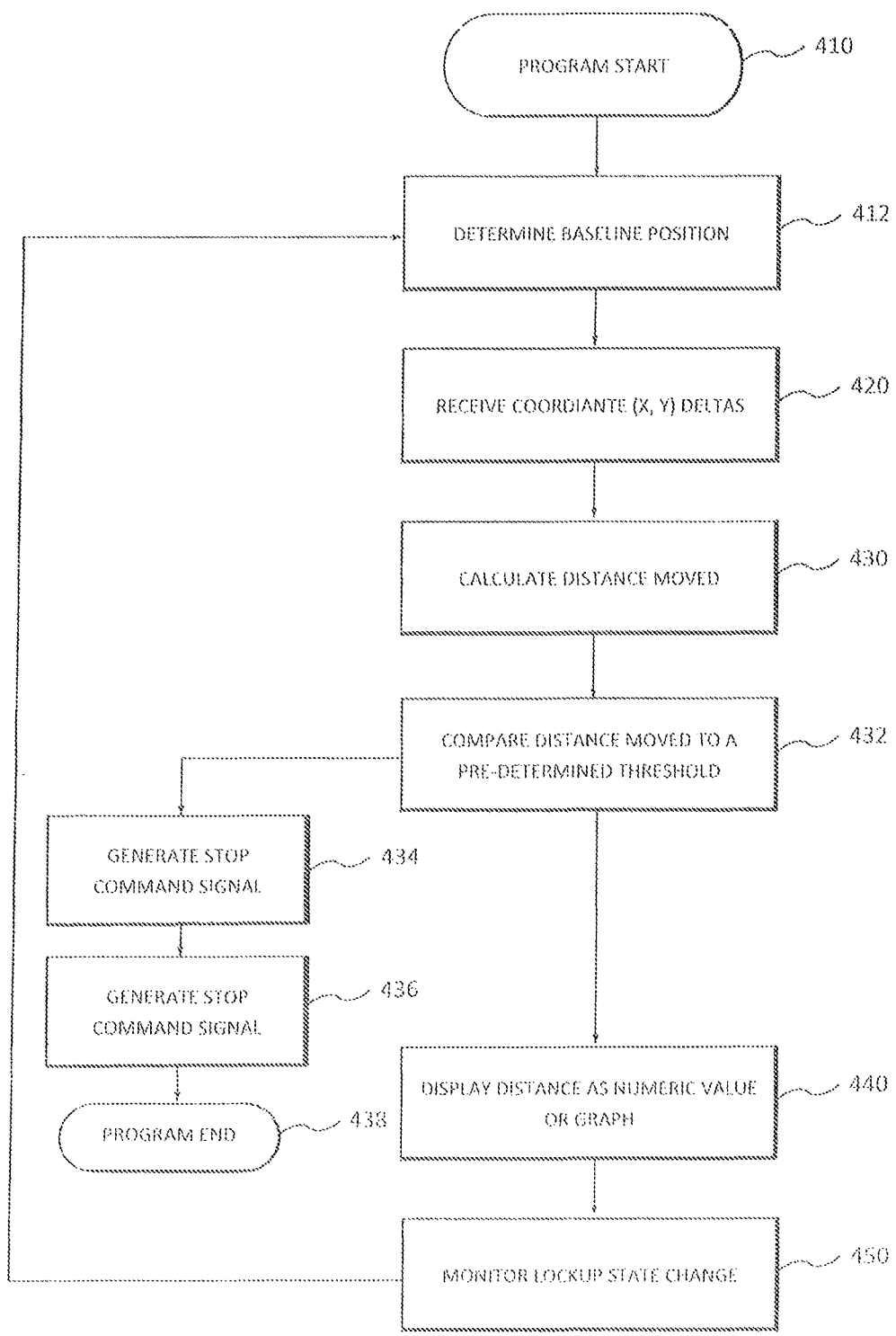
FIG. 7B is a block diagram of the operation of the logic block, in an alternative embodiment.

FIG. 7B is a flow diagram of an embodiment of the computing device 300 of the instant disclosure, showing the operation of the executable code of the logic block 400 in an alternative embodiment. The operation as depicted in FIG. 7B is similar to that as depicted in FIG. 7A until 432, where the executable code of the logic block 400 compares the distance moved to the pre-determined threshold. If the calculated distance moved exceeds the pre-determined threshold, the executable code of the logic block 400 generates a STOP command signal at 434. The position data and the comparison are then displayed to the operator at 436 and the process ends (438). If the calculated distance moved does not exceed the pre-determined threshold the executable code of the logic block 400 does not generate a STOP command signal and, at 440, displays the calculated distance as a numeric value or a graph on the display. At 450, the executable code of the logic block 400 then continuous to monitor for lockup signals, and, in the event of a lockup state change, may then determine a new baseline position.

Figure 8A:
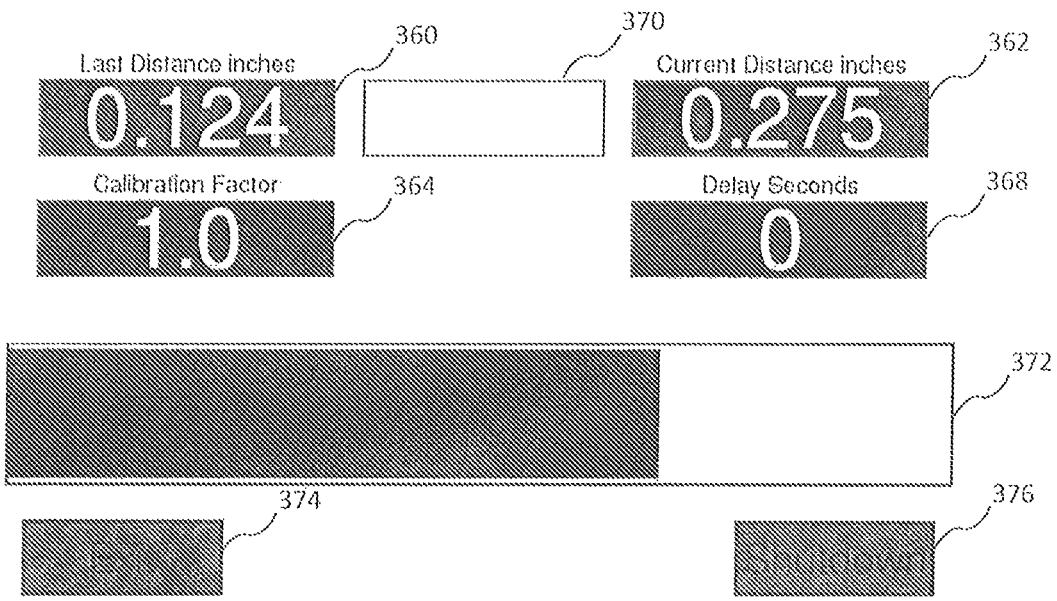
FIG. 8A is a screenshot of a user interface of a display of the position loss detection system, in an embodiment.
Figure 8B:
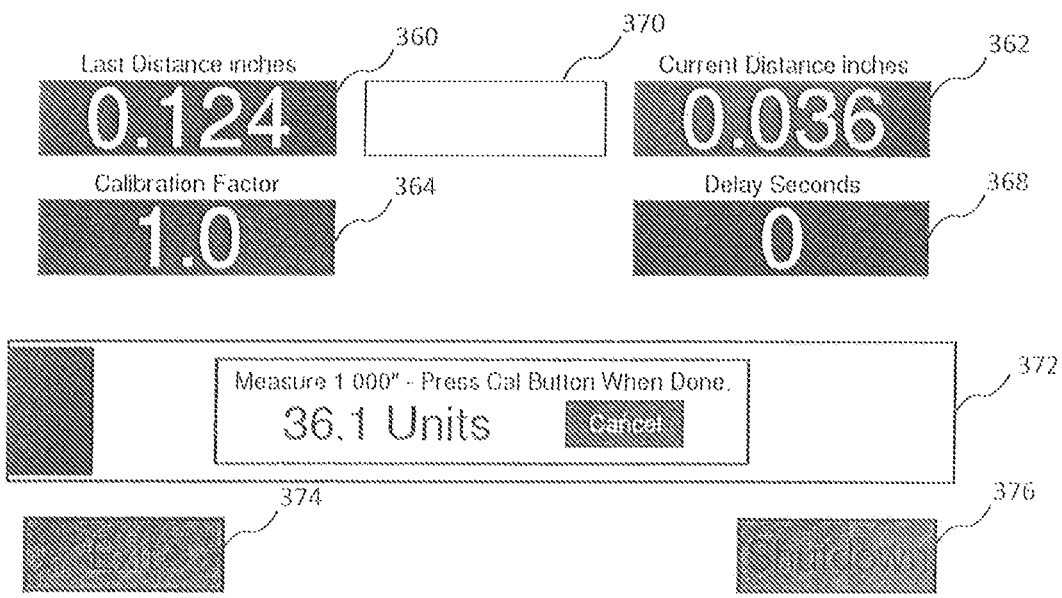
FIG. 8B is a screenshot of a user interface of a display of the position loss detection system, in an embodiment.
Figure 8C:
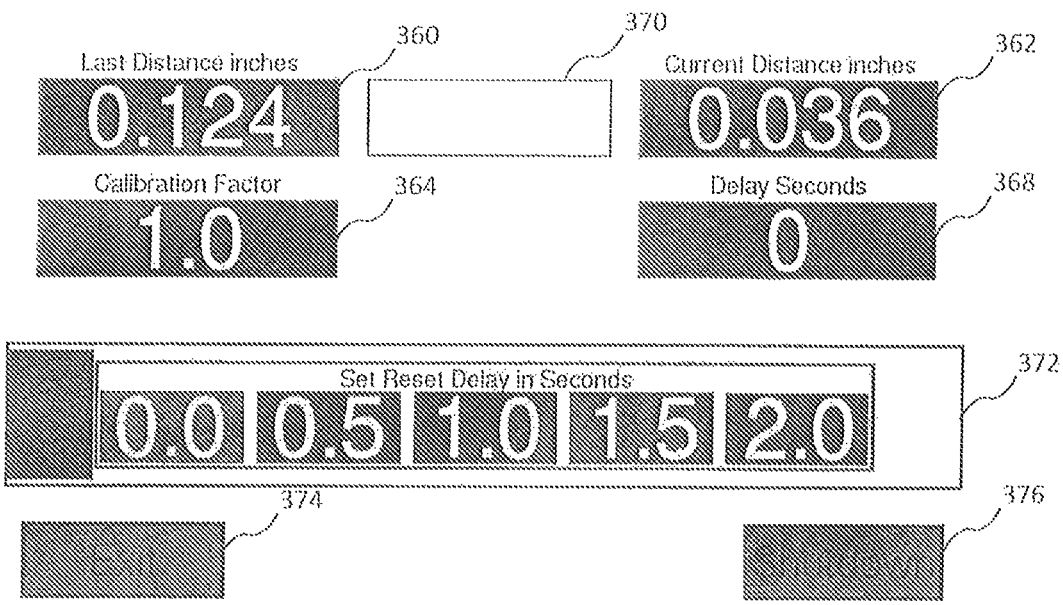
FIG. 8C is a screenshot of a user interface of a display of the position loss detection system, in an embodiment.
Figure 8D:
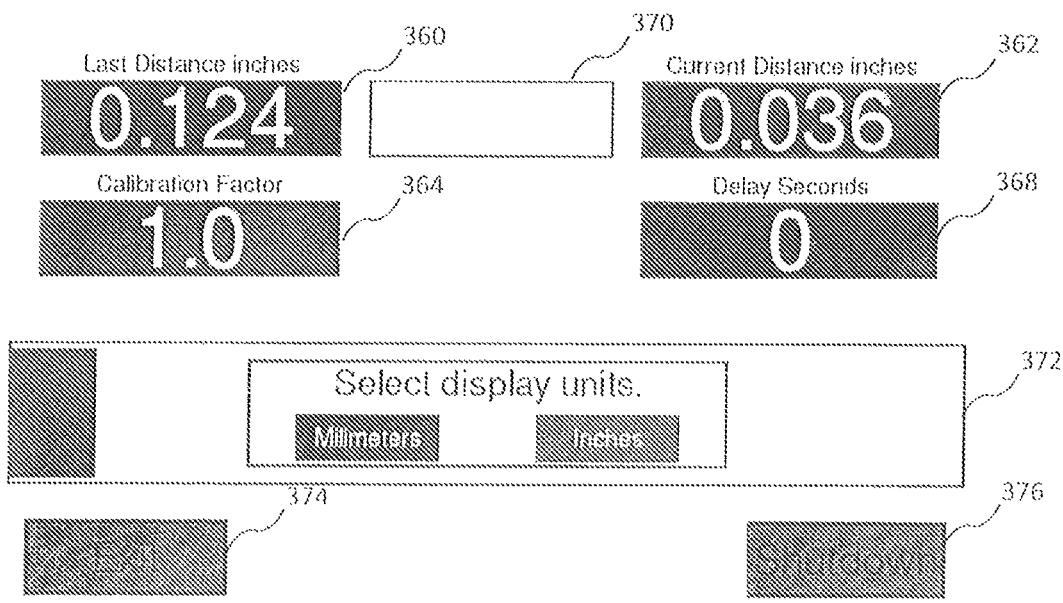
FIG. 8D is a screenshot of a user interface of a display of the position loss detection system, in an embodiment.

FIGS. 8A-E demonstrate an additional embodiment of the display 310, wherein the display 310 is also a user-interface. FIG. 8A demonstrates an embodiment of the user-interface display 310, wherein user-interface display 310 exhibits the last distance measured 360, the current distance 362, the calibration factor 364, the reset delay period 368 and the lockup state 370 (as shown in FIG. 8A, the lockup state is not detected and not shown). As further shown in FIG. 8A, the user-interface display 310 may also exhibit a variable interface field 372 as well as an exit field 374 and a shutdown field 376.

Figure 8E:
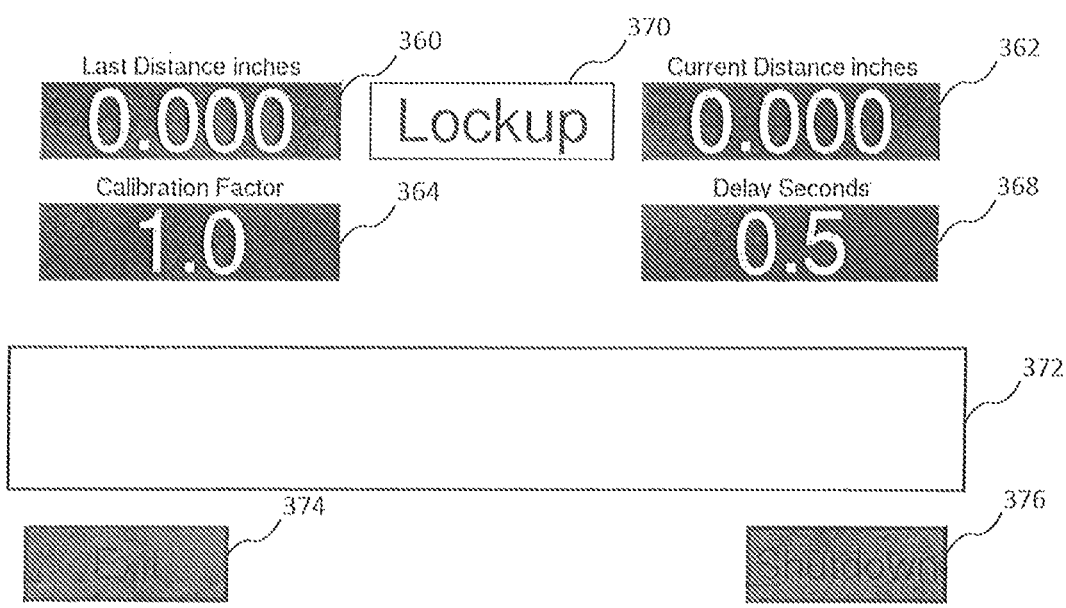
FIG. 8E is a screenshot of a user interface of a display of the position loss detection system, in an embodiment.

As further shown in FIGS. 8B-E, the variable interface field 372 may show, and receive input related to, measurement distance, reset delay and display and measure units. However, a person of ordinary skill in the art would realize that the variable interface field 372 could display, and receive input related to, any facet of position-monitoring process. FIG. 8E exhibits field 370 displaying the lockup state of the machining tool. When the computing device 300 receives a lockup signal from the limit switch 134, the logic block 400 generates and displays a positive lockup indicator at 370. As further shown in FIG. 8E, during lockup, the baseline position is zeroed-out, as indicated by the "0.000" measurement at 362. As further indicated by the "0.5" in field 368, in this embodiment, the logic block 400 baseline will wait 0.5 seconds after receiving the lockup signal to generate the baseline position for the object. As further shown in FIGS. 8A-E, the exit field 374 is configured to receive user input to exit a particular screen of the user-interface display 310 while the shutdown field 376 is configured to receive user input to shut down the position loss detecting system, including any computing devices and any sensors.

The following is a description of an embodiment of the position loss detecting system in operation with a bending tool being used to bend a cylindrical hollow metal tube. An operator of the bending tool installs the position detecting device by mounting the case 110 using case magnets 116 on a non-moving portion of a bending machine, which may be a CNC machine, and then turns on the display 310 of the device. The operator then positions the optical sensors (e.g., the internally mounted optical sensor 112 or the remote optical sensor 113) so that the emitted laser is directed toward the space where the cylindrical hollow metal tube will be positioned so as to measure the movement of the cylindrical hollow metal tube. Further, the operator mounts the sensing arm 130 on the non-moving portion of the bending tool using the sensing arm magnets 132 so that the limit switch 134 is positioned at a point of contact between a moving portion and the non-moving portion of the bending tool.

The operator of the bending tool places the cylindrical hollow metal tube into the non-moving portion of the bending tool and configures and operates the bending tool to engage the cylindrical hollow metal tube in a lockup state. Upon complete engagement of the bending tool about the cylindrical hollow metal tube, the limit switch 134 detects the lockup state of the bending tool and outputs a lockup signal to the PCB 150, which then in turn communicates the lockup signal to the computing device 300 for processing. Upon receipt and processing of the lockup signal and after any desired delay period, the computing device 200 establishes a baseline position and begins to receive signals from the sensors.

During the operation of the bending machine, the optical sensor 113 and/or 112 will measure the position of the cylindrical hollow metal tube and communicate position data to the PCB 150. The PCB 150 in turn communicates a position signal to the computing device 300. The computing device 300 processes the position signal and generates output position data, including current distance from the baseline position and a lockup status signal. The computing device 300 may save the current distance from the baseline position in storage 306 and may recall the same to display as the last distance measured 360 (see FIGS. 8A-E). The computing device 300 communicates the position data to the display 310 in both numerical and graphical format.

In an embodiment, if the computing device 300 determines that the position loss of the cylindrical hollow metal tube exceeds a predetermined threshold, the computer device 300 is configured to generate a STOP signal as an output, which is then communicated to, and interpreted by, the bending machine. Alternatively or simultaneously, in an embodiment, the operator observes the position data as shown on the display 310 may adjust the operation of the bending machine in a manner appropriate relative to the amount and direction of position loss.

A person of ordinary skill in the art will recognize the benefits of the above-described embodiments of the system. The position loss detection system can continuously and consistently provide real-time positional data of the target object for as many indications as needed during the course of the machining process. This includes multiple readings during a single machining action as well as multiple readings over the course of multiple independent machining actions on the same target object. There are no witness lines or ink to remove from the object, leading to a faster cycle times and with no need to polish or clean the object after tooling. Further, the position loss detection system allows an operator to accurately and precisely measure the position, and thus determine position loss, of an affected object during tool from a distance and without endangering the digits of his or her hand. Further, the position loss detection system can report the last distance measured, even after a change in lockup state of the machining tool. Further, the position loss detection system and apparatus can be utilized with a variety of machining tools regardless of safety and light shields that may be incorporated into the tool. Further, the position loss detection system can automatically communicate a STOP signal to the machining tool upon the detection of position loss.

Figure 6:
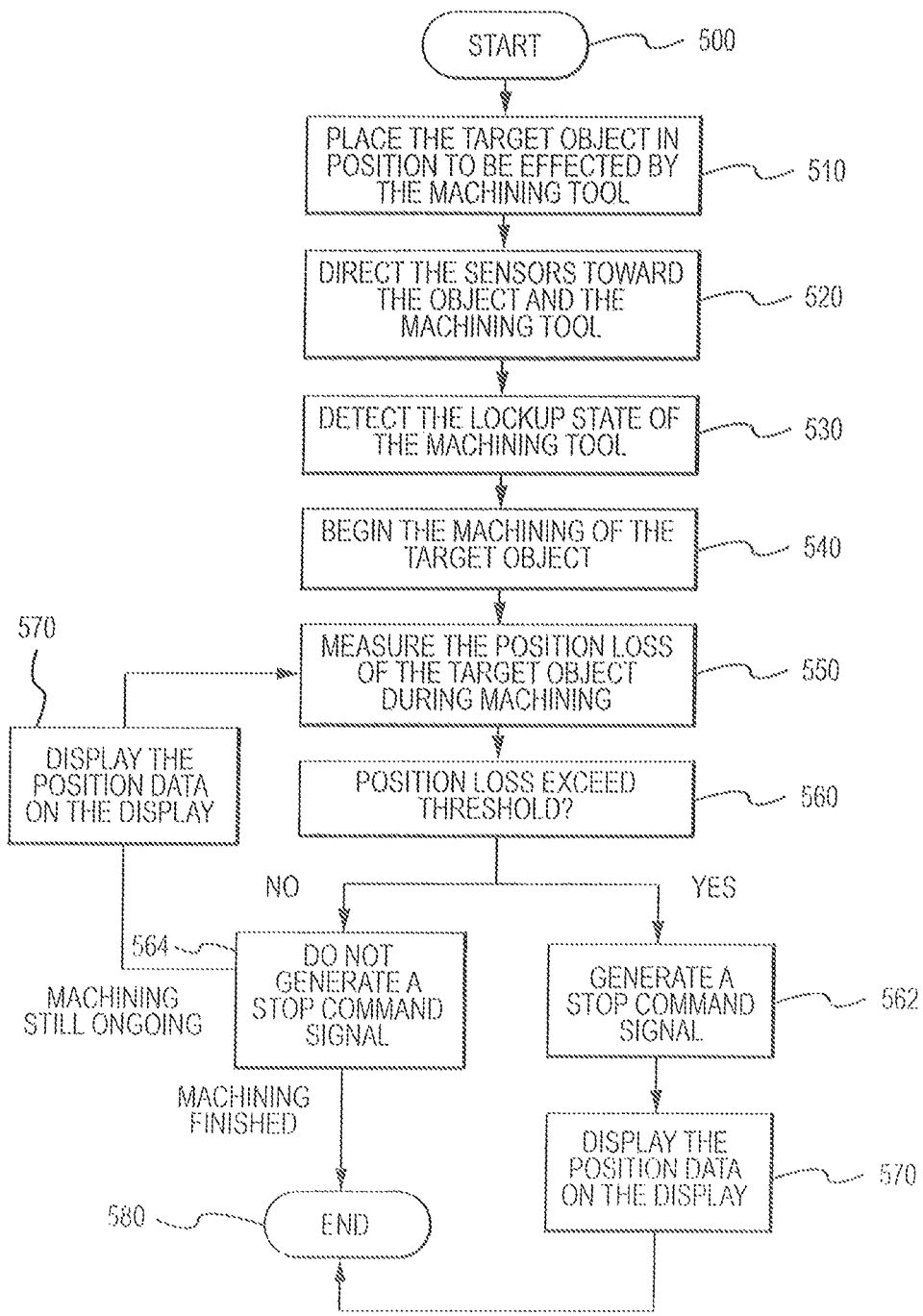
FIG. 6 is flow diagram demonstrating a method for detecting position loss in an object being affected by a machining tool, in an embodiment.

Referring now to FIG. 6, a method for detecting position loss in an object being affected by a machining tool or other external force in accordance with the above embodiments is disclosed. At 500 the method begins. At 510, the operator places the target object into position appropriately relative to the machining tool used in the application. At 520, the operator deploys the position loss detection system as disclosed above, including directing the optical sensor 113 and/or 112 toward the target object, directing the limit switch 134 at the machining tool, and mounting the case 110 on the machining tool. At 530, the machining tool clamps or secures the target object, thereby activating the limit switch 134. As described above, upon activation, the limit switch 134 generates and outputs a lockup signal. After the pre-determined delay period, the computing device then utilizes the position of the target object at the time of the lockup signal as a baseline position. At 540, the machining tool begins performing the machining on the target object.

Still referring to FIG. 6, at 550, the optical sensor 113 and/or 112 continuously detects the position of the target object and outputs the position data to the PCB 150, which then communicates the same to the computing device 300. In accordance with the embodiments described above, the logic block 400 of computing device 300 compares the position data of the target object with the baseline position. At 560, the logic block 400 determines if the change in target object position exceeds a pre-determined threshold. If yes, then at 562 the logic block generates a STOP command. If no, as shown by 564, the logic block does not generate a STOP command. In either case, at 570, the computing device 300 and logic block 400 display the position data on the display 310. Steps 550 through 570 are repeated on a periodic basis throughout the machining of the target object. Once the machining process has ended, the final position data is displayed and the method ends at 580.

In the above embodiment, the command signal generated at step 562 is a STOP command signal. However, in other embodiments, at 562 or 564 the logic block 400 may generate any number of machining commands as known in the art, and they may be generated in any form interpretable by a CNC machine, such as G-code, binary or plain-text.

It should be understood that the computing device as described herein may include conventional processing apparatus known in the art, capable of executing pre-programmed instructions stored in an associated memory, all performing in accordance with the functionality described herein. To the extent that the methods described herein are embodied in software, the resulting software can be stored in an associated memory and can also constitute the means for performing such methods. Implementation of certain embodiments, where done so in software, would require no more than routine application of programming skills by one of ordinary skill in the art, in view of the foregoing enabling description. Such an electronic control unit may further be of the type having both ROM, RAM, a combination of non-volatile and volatile (modifiable) memory so that any software may be stored and yet allow storage and processing of dynamically produced data and/or signals.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. Additionally, the terms "electrically connected" and "in communication" are meant to be construed broadly to encompass both wired and wireless connections and communications. It is intended that all matter contained in the above description or shown in the accompanying drawings shall be interpreted as illustrative only and not limiting. Changes in detail or structure may be made without departing from the invention as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While one or more particular embodiments have been shown and described, it will be understood by those of skill in the art that various changes and modifications can be made without departing from the spirit and scope of the present teachings.

What is claimed is:

1. A system for measuring position loss of an object during machining, the system comprising:
    a portable first sensing device positioned to measure position data of the object while the object is being affected by a machining apparatus, wherein the first sensing device comprises a first mounting surface and a first magnet and the first sensing device is mounted on the machining apparatus at a first position;
    a computing device configured to receive the position data as an input and in response to the position data, generate an output; and
    a display configured to receive the output from the computing device and display the output.

2. The system of claim 1, wherein the first sensing device is an optical sensor.

3. The system of claim 1, further comprising a portable second sensing device, wherein the second sensing device comprises a second mounting surface and a second magnet and the second sensing device is mounted on the machining apparatus at a second position, the second sensing device further configured to detect a lockup state of the machining apparatus and generate a lockup signal.

4. The system of claim 3, wherein the second sensing device is a limit switch.

5. The system of claim 3, wherein the computing device further comprises:
    a processor and a memory;
    a logic block stored in the memory of the computing device which, when executed by the processor, is configured to:
        compare the position data of the object with a baseline position;
        based upon the comparison, determine if the difference in the position of the object relative to the baseline position exceeds a pre-determined threshold; and
        display the position data and the results of the comparison on the display.

6. The system of claim 5, wherein the logic block stored in the memory of the computing device which, when executed by the processor, is further configured to, upon determination that the difference in the position of the object relative to the baseline position exceeds the pre-determined threshold, automatically generate a command signal in a format that can be interpreted by the machining apparatus.

7. The system of claim 6, wherein the command signal is a stop command.

8. The system of claim 6, wherein the logic block stored in the memory of the computing device which, when executed by the processor, is further configured to:
    receive the lockup signal; and
    in response to receiving the lockup signal, reset the baseline position, wherein resetting the baseline position comprises:
        receiving lockup position data comprising a position of the object when the lockup signal was generated; and
        updating the baseline position to be the position of the object when the lockup signal was generated.

9. The system of claim 8, wherein the logic block stored in the memory of the computing device which, when executed by the processor, is further configured to display on the display at least one of a lockup state of the machining apparatus, a delay period, wherein the delay period is the amount of time between the generation of the lockup signal and resetting of the baseline position, and the difference in the position of the object relative to the baseline position.

10. The system of claim 3, wherein the portable first sensing device, the portable second sensing device, the computing device, and the display receive electrical power from a portable electrochemical battery.

11. A method to measure the position loss of an object during machining, the method comprising:
mounting a first sensing device on a machining apparatus at a first position;
directing the first sensing device toward the object;
performing a first machining action on the object;
during the performance of the first machining action and via the first sensing device, taking a first position measurement of the object relative to a first baseline position, wherein taking the first position measurement results in a first position data set;
communicating the first position data set to a computing device;
displaying the first position data set on a display in communication with the computing device;
moving the first sensing device to a second position on the machining apparatus;
directing the first sensing device toward the object;
performing a second machining action on the object;
during the performance of the second machining action and via the first sensing device, taking a second position measurement of the object relative to a second baseline position, wherein taking the second position measurement results in a second position data set;
communicating the second position data set to the computing device; and
displaying the second position data set on the display in communication with the computing device.

12. The method of claim 11, wherein the first sensing device is an optical sensor.

13. The method of claim 11, further comprising:
mounting a second sensing device on a machining apparatus at a third position;
directing the second sensing device toward the machining apparatus; and
prior to the performance of the machining action, taking a lockup measurement of the machining apparatus, wherein the taking the lockup measurement of the machining apparatus results in a lockup data set.

14. The method of claim 13, wherein the second sensing device is a limit switch.

15. The method of claim 13, further comprising:
comparing the first position data set of the object with a baseline position;
based upon the comparison, determining if the movement of the object relative to the baseline position exceeds a pre-determined threshold; and
displaying the first position data set and the results of the comparison on the display.

16. The method of claim 15, wherein upon determination that the difference in the position derived from the first position data of the object relative to the baseline position exceeds the pre-determined threshold, the method further comprises automatically generating a command signal in a format that can be interpreted by the machining apparatus.

17. The method of claim 16, wherein the command signal is a stop command signal.

18. The method of claim 16, further comprising:
receiving the lockup signal; and
in response to the lockup signal, resetting the baseline position by:
receiving a lockup position data set comprising a position of the object when the lockup signal was generated; and
resetting the baseline position to be the position of the object when the lockup signal was generated.

19. The system of claim 18, further comprising displaying at least one of a lockup state of the machining apparatus, a delay period, and the difference in the position of the object derived from the first position data relative to the baseline position, wherein the delay period is the amount of time between the generation of the lockup signal and resetting of the baseline position.

20. The method of claim 13, wherein the first sensing device, the second sensing device, the computing device, and the display receive power from a portable electrochemical battery.

* * * * *